United States Patent
Porath et al.

[11] 3,960,720
[45] June 1, 1976

[54] GEL PRODUCT FOR SEPARATION PURPOSES AND METHOD OF USING THE PRODUCT FOR HYDROPHOBIC SALTING OUT ADSORPTION

[75] Inventors: Jerker Olof Porath; Jan Gunnar Rosengren, both of Uppsala, Sweden

[73] Assignee: Exploaterings Aktiebolaget T.B.F., Uppsala, Sweden

[22] Filed: Mar. 19, 1974

[21] Appl. No.: 452,519

[30] Foreign Application Priority Data

Mar. 23, 1973 Sweden .............................. 7304148

[52] U.S. Cl. .......................... 260/112.5 R; 55/386; 210/198 C; 210/502; 252/316; 252/426; 210/24; 210/31 C
[51] Int. Cl.² ........................................ B01D 15/08
[58] Field of Search .............. 210/31 C, 198 C, 502, 210/24 C; 55/67, 386; 252/316

[56] References Cited
UNITED STATES PATENTS

| | | | |
|---|---|---|---|
| 3,002,823 | 10/1961 | Florin et al. ................... | 210/31 C X |
| 3,285,849 | 11/1966 | Watanabe et al. ................. | 210/54 X |
| 3,350,174 | 10/1967 | Mattenheimer .............. | 210/31 C X |
| 3,453,257 | 7/1969 | Parmerter et al. ............... | 210/502 X |
| 3,527,712 | 9/1970 | Renn et al. ...................... | 210/31 C X |
| 3,536,614 | 10/1970 | Faisque et al. .................... | 210/31 C |
| 3,787,317 | 1/1974 | Jaworek .......................... | 210/502 X |
| 3,850,798 | 11/1974 | Sjoquist ............................ | 210/31 C |

*Primary Examiner*—John Adee
*Attorney, Agent, or Firm*—Young & Thompson

[57] ABSTRACT

The invention concerns a gel product for chromatography based on agarose, and a method of using the product for hydrophobe salting out adsorption. The gel product is characterized in that the hydrophobe groups are bonded to the agarose with ether or esther binding, and that the hydrophobe groups can be composed of aliphatic hydrocarbons, halogen or hydroxy-substituted alkyl groups, with 1 to 20 carbon atoms, or contain 1 or more, up to 5, aromatic nuclei, unsubstituted or substituted with alkyl, alkyloxy, halogen or NO₂ or have the formula

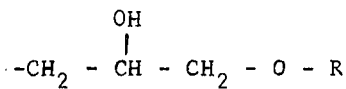

where R can be alkyl, alkenyl, aryl, aralkyl, aralkoxy, alkaryl, optionally substituted with hydroxy, halogen or nitro, and where the alkyl parts of R contain 1 to 20 carbon atoms. The method of separating the amphipatic substances is based on the fact that they are adsorbed by an amphipatic gel in which the salt concentration in the solution is adjusted beyond the level at which the ion concentration least corresponds to the ion concentration in an aqeous solution of 1 M NaCl, and desorption takes place through lowering the ion concentration and/or lowering the pH and/or lowering the polarity of the solvent. The amphipatic substances are primarily proteins or peptides.

4 Claims, 2 Drawing Figures

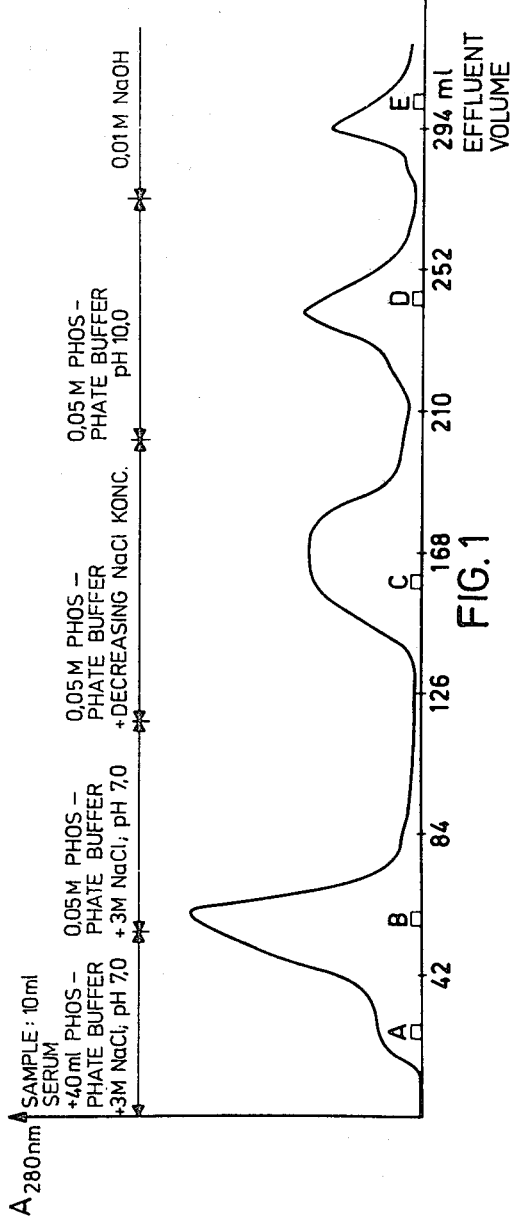
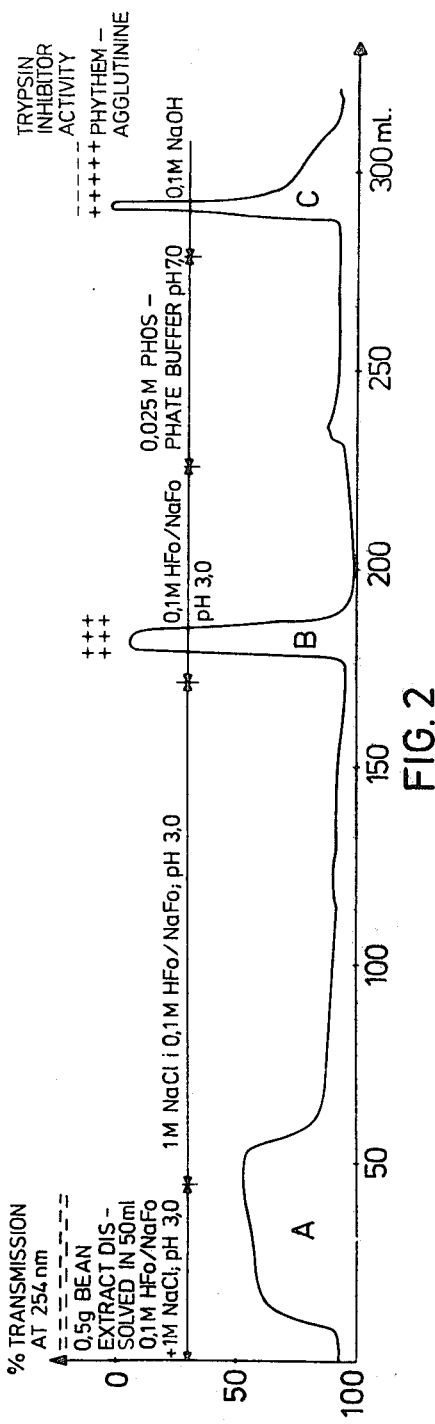

GEL PRODUCT FOR SEPARATION PURPOSES AND METHOD OF USING THE PRODUCT FOR HYDROPHOBIC SALTING OUT ADSORPTION

Isolation of proteins from biological material such as blood, urine, milk and organic extracts from plants and animals is done industrially and in laboratories according to a number of different processes, of which precipitation methods are probably the most used on a large scale. Adsorption methods, especially chromatography, have, due to their great selectivity, become more and more important. It has been a desire to combine the simplicity of the precipitation methods with the selectivity of the adsorption-desorption processes through methods used on a micro as well as a macro scale. Thus one desires methods which can be used both on a few micro-liters of blood serum and on $10^3$ or $10^6$ times larger amounts while retaining the separation exactness. The present invention relates to a gel product which contains both hydrophilic parts from the original agarose gel and hydrophobic groups covalently bound to these. The number and nature of these groups can vary to a high degree, whereby the hydrophobic adsorption capability of the gel relative to hydrophobic molecules or molecules containing hydrophobic sections can be varied. It has also been found that the salt content of the surrounding medium influences the adsorption considerably. In this connection we have found a striking salting out adsorption, i.e. an increased adsorption at higher salt contents. The magnitude, however, of this effect is different for different hydrophobic groups in the gel.

This adsorption can, of course, be used for adsorption chromatography for types of substances other than proteins.

Hydrophobic salting out adsorption according to the invention is a combination of two separation principles each of which is previously known. The characteristic feature is that the hydrophobic adsorption according to the invention is caused by the high salt concentration in the solution.

Only a few works concerning hydrophobic adsorption and desorption of proteins have been published up to now. In Anal. Biochem. 52 (1973) pages 430–443 is described the use of an adsorbent of 4-phenyl butyl amine or ε-aminocaproyl-D-tryptophane methylester coupled to agarose by the bromocyanogen method. An adsorbent of this type contains, in addition to the aromatic nuclei, on the one hand positively charged amino groups, and on the other hand fixed sulfate and carboxylate ions occurring natively in the agarose. Therefore one can expect a combined effect of hydrophobic and electrostatic interaction between proteins in solution and the adsorbent. This has also been shown to be the case. The adsorption has up to now been carried out at low ion strengths and the desorption has been achieved by increasing the ion strength and/or by addition of a polarization decreasing medium such as ethylene glycol. Because of said combined effects the separations are often incomplete and difficult to control.

Salting-out chromatography is characterized by the increase in affinity that certain compounds may exert towards a carrier so that, upon chromatographing the compound, it is retarded in relation to the solvent front. Salting out chromatography on filter paper according to this principle was carried out by Tiselius, Arkiv Kemi, Mineral, Geol., 26B, No. 1, 1948, but since then it has found hardly any application. The reason for the lack of interest in salting out chromatography undoubtedly lies in the incomplete knowledge of the preconditions for the salting out adsorption.

Hydrophobic salting out adsorption is a new and quite interesting phenomenon which occurs in the phase boundary between a solid substance and a surrounding solution. In this case it is probably a phenomenon of a type similar to crystallization, where an increase of the hydrophobic attraction between hydrophobic regions in the solid phase and the dissolved element (the protein) caused by the salt, leads to separating out of the latter at the phase boundary.

It has now been shown according to the present invention, that a gel product especially suited for hydrophobic chromatography and adsorption consists of an agarose, to which neutral and non-ionizing hydrophobic groups have been covalently bound. It can be advantageous for the agarose to be ether-crosslinked. The hydrophobic groups may consist of alkyl, alkenyl, aryl, aralkyl, alkaryl, aralkoxy groups, where the alkyl portion can have 1–20 carbon atoms, to which groups of the type hydroxy or halogen may be bound. The aryl portions can be phenyl or naphtyl, optionally substituted with one or more nitro groups, halogen atoms or alkyl groups. As hydrophobic groups one can also use acyl groups such as alkanoyl or aroyl, which can contain 2–20 carbon atoms and possibly can be substituted with one or more halogen atoms, nitro or hydroxy groups. Appropriate hydrophobic aroyl groups are benzoyl, chlorbenzoyl naphtoyl, nitro benzoyl. The hydrophobic groups can be bound to the agarose, or the ether-cross-linked agarose, by ether or ester bonds.

According to one embodiment of the invention the hydrophobic groups can have the formula

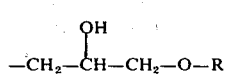

where R can have the definitions for the hydrophobic groups given above.

The gel product according to the invention often adsorbs proteins at low salt concentration but the characteristic for the neutral, amphipatic (containing hydrophobic as well as hydrophilic groups) gel which does not contain ion groups, is that the adsorption as a rule increases with increasing salt concentration. This stands in direct contradiction to the above-mentioned hydrophobic gels, which have been used up to now for separation of biological macromolecules. These contain ionogenic groups, usually amino groups, which leads to a mixed adsorption effect caused by electrostatic as well as hydrophobic interaction. Fractionation of proteins on these amphipatic ion exchangers is carried out so, that the adsorption is done at low salt concentration and the elution is done by increasing the salt concentration. It is possible that through high substitution with appropriate hydrophobic groups one can achieve salting out adsorption even with these amphipatic ion exchangers. However, there is a definite difference in principle between these and the present invention since a gel according to the invention does not contain any ion exchanging groups and the adsorption therefore decreases with decreasing ion strength. Thus one can elute adsorbing proteins by diluting the salt solution. Elution can also be achieved by changing the pH or by reducing the dielectricity constant by mixing in a less polar component into the solution, for exampel dimethyl sulfoxide or ethylene glycol. An effective desorption cannot be done from an amphipatic ion exchanger since the ion adsorption increases with diminishing salt concentration. With gels according to the invention it has been possible to perfect the hydrophobic salting out adsorption.

In the preparation of gels according to the invention several alternative methods can be used. According to one of these an ether-cross-linked gel is used which is produced in the manner disclosed in U.S. Pat. No. 3,853,708 by use of ether forming di-, tri- or poly-functional groups such as di-bromopropanol or bisepoxide.

It is important that the crosslinks are stable against hydrolysis since the synthesis of the derivatives is done under extremely alkaline conditions with an alkylating agent such as alkyl halide.

According to another method the substituent can be in the non-crosslinked gel, which can be made uncharged by previously known methods, by first forcing out water from the gel with suitable organic solutions and then conducting alkylation or acylation in organic solvents by known methods.

It is namely possible to dehydrate in water swelled agarose without affecting the gel structure.

Agarose is assumed to consist of a network of randomly oriented moderately hydrated fibers which are held together by hydrogen bonds (T. C. Laurent, Biochim. Biophys. Acta. 136 (1967) 199 and D. A. Rees, Advan. Carbohyd. Chem. 24 (1969) 267). Agarose gel in bead form can be dehydrated without affecting the gel structure. The transformation of gels to dehydrated form is carried out by carefully removing water by adding acetone which is completely miscible with water. After the gel suspension has been carefully agitated it is allowed to sediment, whereafter the remaining liquid phase is sucked away. By repeating this process several times a water-free suspension is obtained of agarose in bead form in acetone. From acetone a transfer can occur to other solvents, e.g. chlorinated hydrocarbons by using a process analogous to the above.

After the agarose beads have been transferred to a solvent appropriate for alkylation or acylation, they can be alkylated or acylated by known methods. Examples of such methods are alkylation with an epoxy compound or alkylhalogenide or acylation with acid chloride or acid anhydride.

Below are disclosed a few different examples of production of the gel according to the invention. The chromatographic uses of the invention are illustrated in the Figures.

FIG. 1 shows the adsorption at 280 nm in eluate of serum adsorbed on a gel according to the invention as a function of the elution volume.

FIG. 2 shows an adsorption curve at 254 nm of an extract of brown beans fractionated through a bed of gel product according to the invention. A number of different studies are given in Example 25 of adsorption conditions for a series of gels used.

EXAMPLE 1

To 6% agarose crosslinked with dibromopropanol in the form of beads swelled in water with a diameter of 30–200 microns in an amount of 200 ml drained gel was added 200 ml 5 M NaOH, 50 ml benzyl chloride and 1 g sodium borhydride. The suspension was heated to 80°C during agitation and refluxing. The reaction was stopped after 5 hours and the gel product was transferred to a suction funnel, and was washed successively with water, ethyl alcohol and water.

EXAMPLE 2

To 250 ml drained 6% agarose gel cross-linked with epichlorohydrin there was added 250 ml 5 M NaOH solution. 20 g solid NaOH was dissolved and 60 ml ethyl bromide and 1g $NaBH_4$ was added thereto.

The reaction occurred in nitrogen gas in an autoclave for 6 hours at 80°C. After cooling the gel was transferred to a filter and was washed with water, alcohol and water. After drying the gel swells in ethanol in contrast to the original gel.

EXAMPLE 3

25 ml of 6% agarose cross linked with epichlorohydrin and desulfated was mixed with 25 ml 5 M NaOH, 10 ml allyl bromide and 50 mg sodium borhydride. The suspension was kept at 80°C for 3 hours with refluxing and was then transferred to a filter, was washed with water, ethyl alcohol and finally water. 6 g of the gel discoloured 1.2 ml of a bromine solution with 10 ml $Br_2$/250 ml. According to elementary analysis the dry gel contained 39.8% Br.

EXAMPLE 4

To 280 ml 6% agarose there was added 100 ml 2 M NaOH solution, 25 ml epichlorohydrin and 0.5 g sodium borhydride and was heated to 50°C for 1 hour. Then 25 g of 2.6-dimethoxyphenol and 60 ml 2 M NaOH solution was added and the heating was continued. After 2 hours an additional 14 ml epichlorohydrin and 60 ml 2 M NaOH were added and after an additional 2 hours the reaction was broken off. The gel was washed with ethyl alcohol and water.

Hydrophobic adsorbents which in certain respects are reminiscent of the products according to the invention are described in the literature. The coupling to the polymer in that case occurred in another manner, however. For example the aliphatic and aromatic amines have been coupled to agarose, Sepharose. Sepharose is a registered trade mark for agarose gel in bead form from Pharmacia Fine Chemicals, Uppsala, Sweden. Such adsorbents have hydrophobic adsorption at normal ion strengths and also salting out adsorption although this has still not been demonstrated, Zwi Er-el et al., Biochemical and Biophysical Research Communications 49 (1972) 383, Yon, Biochemical Journal 126 (1972) 765. However, these adsorbents differ from the invention in that they contain ion adsorbing groups such as imidocarbonate in cross linkage and as a link to the hydrophobic ligands, whereby a mixed adsorption effect is obtained and furthermore gels which are soluble in strong alkali.

EXAMPLE 5

50 g of Sepharose 6B drained on a filter from water was suspended in 50 ml 5M NaOH containing 0.5 g $NaBH_4$ in a reaction vessel. 12 ml propyl chloride was added to the suspension, whereafter the mixture was reacted for 5 hours at 70°C. The product was washed with water, ethanol and water to neutral pH.

EXAMPLE 6

Example 5 was repeated with 12.5 ml butyl bromide instead of propyl chloride and the mixture was reacted 5 hours at 95°C.

EXAMPLE 7

200 g desulfated Sepharose 6B cross-linked with 2.3-dibromopropan-1-ol was suspended in 200 ml 5 M NaOH containing 1 g NaBH$_4$. 50 ml hexylbromide was added to the suspension, whereafter the mixture was reacted for 35 hours at 100°C. The product was washed with water, ethanol, water. After the reaction the gel had a volume of about 100 ml in water.

EXAMPLE 8

150 ml cross-linked and desulfated agarose in the form of spherical beads 45–250 microns in size were suspended in 150 ml 5 M NaOH containing 1 g NaBH$_4$ in a round-bottomed flask. 40 ml vinylidene chloride was added to the suspension. The mixture was reacted for 4 hours at +80°C in an autoclave in a nitrogen gas atmosphere. The gel was washed with water, ethanol, water. After complete bromination in CCl$_4$ the product contained 1.55% Br.

EXAMPLE 9

6 g of the gel product according to Example 3 was transferred to a suspension in 20 ml tetrachlorethane via acetone. Bromine was added dropwise, as a solution containing 40 ml Br$_2$ per 1000 ml tetrachlorethane. 1.2 ml of the bromine solution was used up for complete addition to the double bond as could be noted by the cessation of the decolourization of the bromine solution. According to elementary analysis the dry gel contained 39.8 percent by weight of bromine.

EXAMPLE 10

0.25 g NaBH$_4$ was dissolved in 50 ml M NaOH and was added to 50 g epichlorohydrine-cross-linked, desulfated Sepharose 6B in a round-bottomed flask. The solution was refluxed and was reacted with 12 ml propylene oxide for 3 hours at 30°C followed immediately by 2 hours at 65°C. The product was washed with water, ethanol and water.

EXAMPLE 11

0.5 g NaBH$_4$ was dissolved in 100 ml 5 M NaOH. 100 Ml cross-linked desulfated Sepharose 6B was added to a round-bottomed flask and was suspended in NaOH solution. 34 g 1-chloromethylnaphthalene was added and the mixture was then reacted for 20 hours at 95°C while being refluxed. The product was washed with water, alcohol, dimethyl sulfoxide and water. After the reaction the gel occupied a volume of 41 ml in water.

EXAMPLE 12

Activation: 280 g Sepharose 6B was suspended in 100 ml 2 M NaOH containing 0.5 g NaBH$_4$. 28 ml epichlorohydrin was added to the suspension. The activation proceeded for 1 hour at +50°C.

Coupling: Immediately after the activation 25 g 2.6-dimethoxyphenol and an additional 60 ml 2 M NaOH was added. After an additional 2 hours 14 ml epichlorohydrin and 60 ml 2 M NaOH were added whereupon the mixture was finally reacted for an additional 2 hours. The gel was washed on a filter with water, ethanol and water.

EXAMPLE 13

15 ml cross-linked desulfated Sepharose 6B was reacted for 15 hours at +60°C with 15 ml 0.7 M NaOH and 1 g α-chloro-p-nitrotoluene. The yellowish product was carefully washed with water, alcohol and water. The product contained 0.42% nitrogen.

EXAMPLE 14

50 ml cross-linked desulfated Sepharose 6B was suspended in 50 ml 5 M NaOH containing 0.25 g NaBH$_4$. The mixture was reacted with 12 ml p-chlorobenzylchloride for 5 hours at +80°C. The gel was washed with water, ethyl alcohol and water. Elementary analysis gave 6.15% chlorine in the product. After the reaction the gel had a volume of 34 ml in water.

EXAMPLE 15

50 ml cross-linked, desulfated Sepharose 6B was washed with pyridine on a glass filter funnel, until all the water was forced out of the gel. The gel was suspended in 50 ml pyridine and 20 ml benzoyl chloride was added. The mixture was reacted for 2 hours at +65°C, whereafter it was washed with pyridine, ethyl alcohol and water. The volume in water was about 20 ml after benzoylation.

EXAMPLE 16

Example 15 was repeated with 20 ml 4-chlorobenzoyl chloride instead of benzoyl chloride. Afterwards the gel was observed to have shrunk in water to 27 ml and contained 15.2% chlorine.

EXAMPLE 17

40 ml cross-linked Sepharose 6B was transferred in pyridine whereafter the gel was suspended in 40 ml pyridine. 80 ml acetic anhydride was added to the suspension and thereafter a total of 8 ml acetyl chloride in drops during cooling. The mixture was then reacted 2 hours at +65°C. The gel was washed with pyridine, ethanol and water. The acetylated gel had shrunk so that in water it had a volume of 12 ml.

EXAMPLE 18

60 ml cross-linked Sepharose 6B was transferred in pyridine and was suspended in 60 ml butyric acid anhydride. 12 ml butyric acid chloride was added in drops and during cooling, whereafter the mixture was reacted for 2 hours at +65°C. The gel was washed with pyridine ethanol and water. After substitution the gel had a volume of 20 ml in water.

EXAMPLE 19

300 ml 6% agarose gel was transferred to a filter via acetone to ethylendichloride so that all of the water was forced out. The mixture of ethylendichloride and agarose gel was adjusted to a final volume of 600 ml. 6 ml 48% bortrifluoride etherate was added at 25°C. 6 ml octylglycide ether was added during vigorous agitation, whereafter the reaction was allowed to proceed for 40 minutes. The gel was washed with 2 liters dichloroethane, 2 liters acetone, and then 4 liters of water.

EXAMPLE 20

300 ml Sepharose 6B was transferred on a filter via acetone to dichloroethane, so that all the water was forced out. The mixture of agarose gel and dichloroethane was adjusted to a final volume of 600 ml. 10 ml 48% bortrifluoride etherate was added at 25°C. During vigorous agitation a solution was added of 8.3 g phenyl glycidyl ether in 100 ml dichloroethane. The reaction was allowed to run for 1 hour at room temperature. After washing the gel with acetone a sample was dried in a vacuum. IR-analysis of this sample showed that the gel was substituted since the spectrum showed frequencies characteristic of the phenyl group.

EXAMPLE 21

10 ml 4% agarose beads in aqueous suspension were transferred via acetone to 10 ml dichloroethane as in Example 19. 0.2 ml 48% bortrifluoride etherate in ether was added, whereafter 0.3 ml 1.2-epoxy-3-chloropropane was added during agitation at 25°C. The reaction was allowed to run for 40 minutes. The gel suspension was then washed repeatedly with acetone and was then dried in a vacuum.

The chlorine content analysis gave 10.60% Cl, which corresponds to a substitution of 0.68 mol 1-chloro-2-hydroxipropyl per repeating unit (galactose) in the agarose polymer.

EXAMPLE 22

300 ml sedimented 6% agarose gel cross-linked with dibromine propanol was transferred to hexamethyl phosphoric acid triamide (HMPTA) via acetone as in Example 17. The final volume was adjusted to 400 ml and 24 g of an oil suspension of NaH was added to the mixture. Thereafter a mixture of 17.5 g p-nitrobenzyl-chloride and 100 ml HMPTA were added. The mixture was heated to 50°C and was allowed to react during agitation at this temperature for 2 hours. After repeated washings with ethanol, toluene and acetone the gel was suctioned dry of acetone and was dried in a vacuum. The dried gel contained 1.3% nitrogen.

EXAMPLE 23

Sepharose 4B was transferred to dichloroethane on a filter via acetone. 25 ml of this gel was suspended in 30 ml dichloroethane. 0.5 ml 48% bortrifluoride etherate in ether was added and after 5 minutes 1.5 g p-nitrophenyl glycidyl ether dissolved in 7.5 ml dichloroethane was added. The reaction proceeded for 40 minutes at 25°C.

The gel obtained was washed on a filter with 500 ml dichloroethane and 500 ml acetone and was then dried. The gel product contained 2.10% N which corresponds to 0.344 molar nitrophenyl substituent per repeating unit (galactose) in the polymer.

EXAMPLE 24

The effect of different salts on the adsorption capacity of benzyl-Sepharose 6B according to Example 1.

Experimental conditions

Column dimensions: column length = 1.5 cm, total volum $V_t$ = 1.21 ml.

Buffer: 0.05 M tris-CHl buffer pH 7.5 with an addition of extra salts according to the table below.

Trials carried out as front analyses with cytochrome C in the concentration 1 mg/ml. The breakthrough volume of the front = $V_e$.

Results

| Salt | Conc. (M) | Ion strength of the added salt (M) | $V_e/V_t$ |
|---|---|---|---|
| NaCl | 3 | 4.5 | 9.9 |
| KCl | 3 | 4.5 | 9.5 |
| KBr | 3 | 4.5 | 8.25 |
| KF | 3 | 4.5 | 8.0 |
| LiCl | 3 | 4.5 | 6.9 |
| NH$_4$Cl | 3 | 4.5 | 4.4 |
| NH$_4$-formiate | 3 | 4.5 | 5.15 |
| MgCl$_2$ | 1.5 | 4.5 | 5.8 |
| CaCl$_2$ | 1.5 | 4.5 | 12.0 |
| BaCl$_2$ | 1.5 | 4.5 | 14.5 |
| Na$_2$SO$_4$ | 1 | 3 | 4.0 |
| Na-trichloroacetate | 0.5 | 0.5 | 8.7 |
| NaCl/glycine | 3/2 | 6.5 | 18.3 |
| NaCl/N.N-dimethylformamide | 3/2 | 4.5 | 2.12 |
| "Pure tris buffer" | 0.05 | 0 | 2.7 |
| 0.05 M phosphate buffer | 0.05 | 0 | 1.47 |

The table shows the hydrophobic salting out ability of various salts. They further support the potential possibilities of the hydrophobic salting out chromatography since the choice of the salt significantly affects the interaction of the various proteins with the gel. This can be exploited to increase the separation capacity of the gels.

EXAMPLE 25

The following table shows trials carried out with front analysis of Cyt. C according to Example 24. The values for pH and ion strength are given in the table. The capacity values under different conditions are given as $V_e/V_t$. At pH 7 0.05 M phosphate buffer was used and at pH 3 0.1 M formiate buffer. The example number is the number of the example where the preparation method for the gel is given.

| Ex.No. | hydrophobic substituent | Capacity ($V_e/V_t$) molarity NaCl (pH 7.0) | | | molarity NaCl (pH 3.0) | | |
|---|---|---|---|---|---|---|---|
| | | 0 | 1 | 3 | 0 | 1 | 3 |
| | Control (agarose) | | | | | 0.73 | 0.72 |
| 2 | Ethyl | | | | | 0.88 | 2.2 |
| 5 | Propyl | 0.82 | | 0.92 | 1.06 | 2.3 | 18 |
| 3 | Allyl | | | 0.95 | | 5.2 | 25 |
| 6 | Butyl | | | 1.1 | | | 38 |
| 7 | Hexyl | | | 1.4 | | | 40 |
| 1 | Benzyl | 0.90 | 1.6 | 10 | 3 | 20 | 55 |
| 14 | p-chlorobenzyl | 1.12 | | 4.8 | 6.2 | | 40 |
| 13 | p-nitrobenzyl | | | | | 1.5 | 3.3 |
| 11 | Methylnaftyl | 4.5 | | 10.7 | | | 41.2 |
| 17 | Acetyl | 0.64 | 0.72 | 0.72 | 1.95 | | 80 |
| 18 | Butyryl | 11.6 | | | | | 43 |
| 15 | Bensoyl | 30 | | | 31 | | 80 |
| 16 | p-chlorobenzoyl | 30 | | | | | 51 |
| 10 | Hydroxypropyl | | | | | | 0.82 |
| 19 | Octyl glycidyl ether | | | | | | 19 |
| 20 | Phenyl glycidyl ether | | | | | | 2.0 |

EXAMPLE 26

Cross-linked benzylated agarose according to Example 1 was packed in a column with the dimensions 1.4 × 8 cm. The gel was equilibrated with 0.1 M formate buffer pH 3.0 containing 3 M NaCl. One liter urine concentrate was pH adjusted to 3.0 and was pumped through the benzylated agarose. At elution with various solutions the proteins in the urine concentrate were separated in different fractions.

EXAMPLE 27

Benzylated Sepharose according to Example 1 was packed to a volume of 3.7 ml in a column with a length of 4.6 cm. The column was equilibrated with 0.0514 M sodium phosphate buffer pH 6.2 containing 5 M NaCl. Whey to which 5 M NaCl was added and whose pH was adjusted to 6.2 was then pumped into the column. A total of 75 ml was pumped in. The column was then washed with the solutions given in the chromatogram. The protein content in the various fractions was measured with the Folin method by measuring the light absorption at 750 nm.

EXAMPLE 28

2.1 ml Benzyl Sepharose 6B according to Example 1 was packed in a chromatography column to give a gel bed with length 2.6 cm. The gel was equilibrated in acetate buffer pH 3.0 containing 0.35 M NaCl. Into the chromatography column a sample was introduced consisting of an extract from bovine pancreas dissolved in 200 ml 0.05 M acetate/hydrochloric acid buffer pH 3.0, 0.35 M NaCl. The column was eluted and various fractions were collected. As a measure of their protein content the absorbance was measured at 280 nm. The elution peaks were analyzed by polyacrylamide electrophoresis.

EXAMPLE 29

Cross-linked benzylated agarose according to Example 1 was packed into a 1.0 × 19.6 cm bed in 0.05 molar phosphate buffer, pH 7.0 containing 1 molar NaCl. A front chromatogram was done as in Example 28 whereby the cytochrome front was obtained at an effluent volume corresponding to 1.7 total bed volumes.

The bed was washed with 0.05 M phosphate buffer, pH 7.0 containing 3 molar sodium chloride and a 0.1% cytochrome C-solution was added to this salt solution as above in the bed. The cytochrome C front broke through at an effluent volume corresponding to 8.3 total bed volumes.

EXAMPLE 30

The benzyl agarose bed according to Example 29 was washed with 0.1 molar sodium formate buffer, pH 3.0 whereafter a front chromatogram was taken up of 0.1% cytochrome C in the buffer solution. The front was obtained at about 1.5 total volumes.

The bed was washed with the formate buffer containing 3 molar NaCl and 0.1% cytochrome and this solution was front chromatographed. The front was attained at about 19 total volumes. The experiment shows that a certain adsorption of cytochrome C is obtained in the buffer solution, but that the adsorption is strengtened greatly by the addition of 3 M sodium chloride.

EXAMPLE 31

The bed in Example 29 was washed with 0.05 M phosphate buffer, pH 7 containing 3 M NaCl. 10 ml dialyzed serum was diluted with 40 ml buffer/3 M NaCl and was introduced into the bed, thereby obtaining a front chromatogram. The column was washed with 70 ml buffer/3 M NaCl, whereafter the elution was started with a "negative salt gradient" from 3 M to 0 M. Additional material was eluted in two steps:
1. with 0.05 phosphate buffer pH 10.0 and
2. 0.01 M NaOH:

The adsorption at 280 nm was measured in the eluate, FIG. 1. Samples were taken from different parts of the chromatogram as indicated in the Figure. The samples were dialyzed and examined with pore-gradient electrophoresis. It is evident therefrom that an effective separation of certain components is achieved even with this primitive form of chromatography. Fraction A contains $\alpha_2$-macroglobulines and $\beta$-lipoprotein. Fractions B and C contain in addition to albumin discrete immunoglobulin components and haphtoglobulin, but there also occur sharp contrasts between these fractions. Ceruloplasmin for example, is in C but not B.

EXAMPLE 32

The benzyl ether agarose bed according to Example 1 was washed with 0.1 M sodium formate buffer, pH 3.0 containing 1 M sodium chloride. 0.5 g extract of brown beans (*Phaseolus vulgaris*) dissolved in 50 ml of the buffer, was introduced into the bed with continuous measuring of the transmission at 254 nm. The bed was then washed with about 165 ml of the starting buffer, whereafter some protein was eluted with the formate buffer without NaCl. An insignificant elution of protein was obtained in washing with 0.025 M phosphate buffer of pH 7.0 but during the subsequent extraction with 0.1 molar NaOH an appreciable amount of substance left the bed. Measurement of hemagglutination and trypsin inhibitor activity showed that the material that first passed did not contain these activities. Lectin was distributed on the material in the peaks B and C, see FIG. 2, mainly in peak C. The trypsin inhibitors were only in peak B.

EXAMPLE 33

The product from Example 4 (2.6 dimethoxiphenyl ether agarose) was used for a front chromatogram with cytochrome C (1 mg/ml) according to Example 5 in the following solutions. The column dimensions were 0.5 × 12.4 cm.
  a. 0.05 M phosphate buffer pH = 7. The front at 0.7 bed volumes.
  b. 0.1 M formate buffer pH = 3.0, 1 M NaCl. The front was obtained at 1.3 bed volumes.
  c. 0.1 M formate buffer pH = 3.0, 3 M NaCl. The front was obtained at 5.0 bed volumes.

What we claim is:
1. Method of separating proteins containing both hydrophilic groups such as OH, $NH_2$, COOH and hydrophobic groups such as alkyl, phenyl, indyl, comprising adsorbing the proteins from a solvent onto a gel packed in a column and consisting essentially of agarose to which neutral hydrophobic groups which do not form ions are covalently bonded and having the formula

$$P-O(CO)_{n'} -R$$

where P is the agarose residue and R is a hydrophobic radical selected from the group consisting of hydrocarbon and ether residues, $n'$ being no greater than 1, the hydrophobic group having the formula $C_nH_{2n+1}$ unsubstituted or substituted with halogen or hydroxy, $C_nH_{2n-}$ $_1$, $X_mC_6H_{5-m}-$, $X_mC_6H_{5-m}CY-$, $X_mC_6H_{5-m}CY-CZ-$, $X_mC_{10}H_{7-m}-$, $X_mC_{10}H_{7-m}CY-$, $X_mC_{10}H_{7-m}CY-CZ-$ or

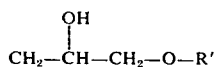

where
- X is H, $C_pH_{2p+1}$, $CH_3$, $C_2H_5$, $OC_pH_{2p+1}$, halogen or $NO_2$,
- n is an integer from 1 to 20,
- Y and Z are O or $H_2$,
- m is an integer from 0 to 5,
- p is an integer from 1 to 10 and
- R' is alkyl, alkenyl, aryl, aralkyl, aralkoxy, alkaryl, unsubstituted or substituted with hydroxy, halogen or nitro, the alkyl portions of R' containing 1–20 carbon atoms, and desorbing the adsorbed material by lowering of the ion strength and/or changing the pH and/or lowering the polarity of the solvent.

2. Method according to claim 1, and adjusting the salt level of said solution above the level where the ion strength at least corresponds to the ion strength in an aqueous solution of 1 M sodium chloride.

3. Gel product for hydrophobic salting out chromatographic adsorption for the separation of protein fractions, consisting essentially of agarose to which neutral hydrophobic groups which do not form ions are covalently bonded and having the formula $$P-O(CO)_{n'}-R$$

where P is the agarose residue and R is a hydrophobic radical selected from the group consisting of hydrocarbon and ether residues, n' being no greater than 1, the hydrophobic group having the formula $C_nH_{2n+1}$ unsubstituted or substituted with halogen or hydroxy, $C_nH_{2n-1}$, $X_mC_6H_{5-m}-$, $X_mC_6H_{5-m}CY-$, $X_mC_6H_{5-m}CY-CZ-$, $X_mC_{10}H_{7-m}-$, $X_mC_{10}H_{7-m}CY-$, $X_mC_{10}H_{7-m}CY-CZ-$ or

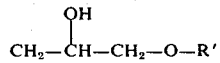

where
- X is H, $C_pH_{2p+1}$, $CH_3$, $C_2H_5$, $OC_pH_{2p+1}$, halogen or $NO_2$,
- n is an integer from 1 to 20,
- Y and Z are O or $H_2$,
- m is an integer from 0 to 5,
- p is an integer from 1 to 10 and
- R' is alkyl, alkenyl, aryl, aralkyl, aralkoxy, alkaryl, unsubstituted or substituted with hydroxy, halogen or nitro, the alkyl portions of R' containing 1–20 carbon atoms.

4. Gel product according to claim 3, in which the hydrophobic groups are β-hydroxy propyl or β-hydroxy butyl.

* * * * *